United States Patent [19]
Rios

[11] 4,028,753
[45] June 14, 1977

[54] AUTOMATICALLY ROCKABLE INFANT'S CRIB

[76] Inventor: Augusto Rios, 1815 Grand Concourse, Bronx, N.Y. 10453

[22] Filed: Oct. 16, 1975

[21] Appl. No.: 623,256

[52] U.S. Cl. .......................................... 5/108; 5/105
[51] Int. Cl.² .......................................... A47D 09/02
[58] Field of Search ............. 5/104, 105, 108, 109; 312/340, 341

[56] References Cited
UNITED STATES PATENTS

| | | | |
|---|---|---|---|
| 2,961,666 | 11/1960 | Fingel | 5/109 |
| 3,464,744 | 9/1969 | Fall | 312/340 |
| 3,601,464 | 8/1971 | DeBoer | 312/341 NR |
| 3,619,826 | 11/1971 | Lisotte, Sr. | 5/109 |
| 3,638,248 | 2/1972 | Silvergate | 5/105 |

*Primary Examiner*—Casmir A. Nunberg
*Attorney, Agent, or Firm*—Joel Halpern

[57] ABSTRACT

An automatically rockable crib for infants includes a crib having rollers on the bottom thereof and a crib supporting assembly. The supporting assembly has a platform stand at each corner with a transversely extending arcuate surface thereon. Electric motor means is connected to the crib and oscillates the crib on the rollers along the arcuate surfaces of the platform stands.

4 Claims, 2 Drawing Figures

AUTOMATICALLY ROCKABLE INFANT'S CRIB

BACKGROUND OF THE INVENTION

The invention relates to rockable cribs for infants and more particularly to an automatically rockable crib simply constructed and operable with relatively low power requirements.

Automatically rockable cribs for infants have been well known heretofore. However, such prior devices have either been complex structurally and thus too costly to achieve a wide level of public acceptance or they have been relatively heavy cumbersome structures which required substantial power consumption during operation. Such latter devices also failed to achieve any significant degree of public acceptance.

Another serious deficiency of prior automatically rockable cribs has been the inability to provide a consistently smooth rythmic rocking motion. It will be appreciated that where the horizontal force component becomes excessive the infant will be caused to roll This periodic rolling motion tends either to interrupt the sleep of the infant or to prevent the infant from falling asleep at all.

SUMMARY OF THE INVENTION

It is one object of the invention to provide an automatically rockable crib for infants which is simple in structure and which is operable with minimum power requirements.

Another object of the invention is the provision of an automatically rockable crib for infants which affords a consistently smooth rythmic rocking motion and avoids imparting any rolling motion to the infant.

Other objects and advantages of the invention will become readily apparent from the following description of the invention.

According to the present invention there is provided an automatically rockable crib for infants comprising in combination:

a crib;

a crib support assembly rockably supporting the crib and including a base and a platform stand carried by the base at each corner thereof, each platform stand being provided with an upwardly facing transversely extending arcuate surface;

roller means interposed between the bottom of the crib and each of the arcuate surfaces;

and electric motor means operatively connected to the crib for transversely oscillating the crib on the rollers along the arcuate surfaces.

BRIEF DESCRIPTION OF THE DRAWINGS

In order that the invention may be more fully understood it will now be described by way of example, with reference to the accompanying drawings in which.

DETAILED DESCRIPTION OF THE DRAWINGS

Figure 1:
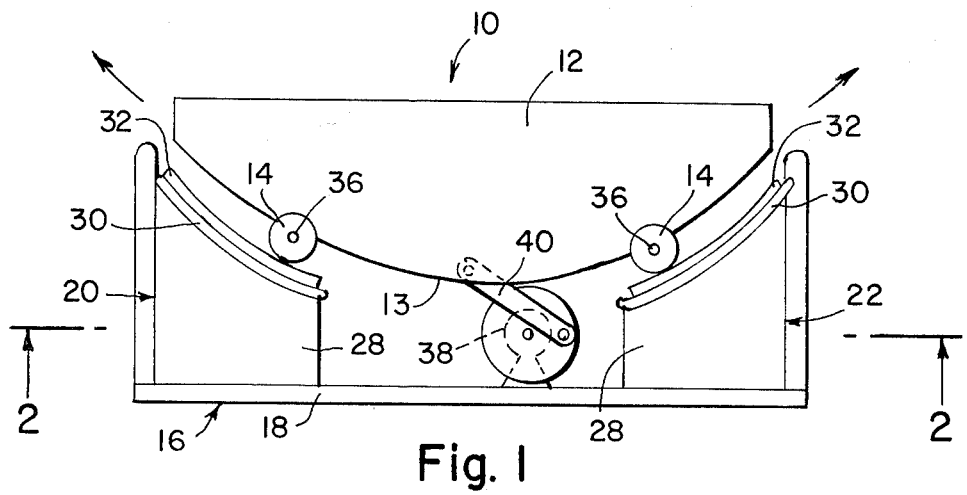
FIG. 1 is a side elevational view of the automatically rockable crib embodying the features of the invention and FIG. 2 is a bottom plan view, partially in cross-section and partly broken away, taken along line 2—2 of FIG. 1.

Referring to the drawings there is shown generally by reference numeral 10 an automatically rockable crib structure. The structure includes a crib 12 which is constructed conventionally except for the bottom 13 which, as will be more specifically described hereafter, is provided with roller means 14 and with a contour in at least certain regions.

The crib 12 is rockably supported on a crib support assembly designated generally by reference numeral 16. The crib support assembly includes a base member 18 which is dimensioned to be at least coextensive in plan view with the crib 12. The base may be either a peripherally extending member with appropriate cross-bracing to afford the desired rigidity or it may comprise a platformtype base having peripherally extending elements and a covering sheath thereover. The particular form of construction employed is not critical. However, platform stands 20, 22, 24 and 26 are carried by the base at each corner thereof. The platform stands, all of which are preferably identical in construction, include a pillar-like pedestal 28 and a transversely extending, upwardly facing arcuate bearing surface 30. Desirably each of such arcuate surfaces is provided with a friction-reducing coating 32 for a purpose which will become clear.

Interposed between the bottom 13 of the crib and each of the arcuate surfaces 30 is roller means 14 which may take the form of either a wheel or roller. Desirably such roller means are rotatably mounted on the crib 12 such as by means of an axle 36 which may be journaled in depending flanges (not shown) carried by the crib 12.

The arcuate surfaces, as stated above, are given a layer or coating of a friction-reducing material such as polytetrafluoroethylene (Teflon) in order to facilitate the movement of the crib along such surfaces.

The bottom of the crib, at least in those regions which overlie the arcuate surfaces, is contoured complementarily with the contours of the arcuate surfaces to thereby permit a rocking movement to be imparted to the crib.

Figure 2:
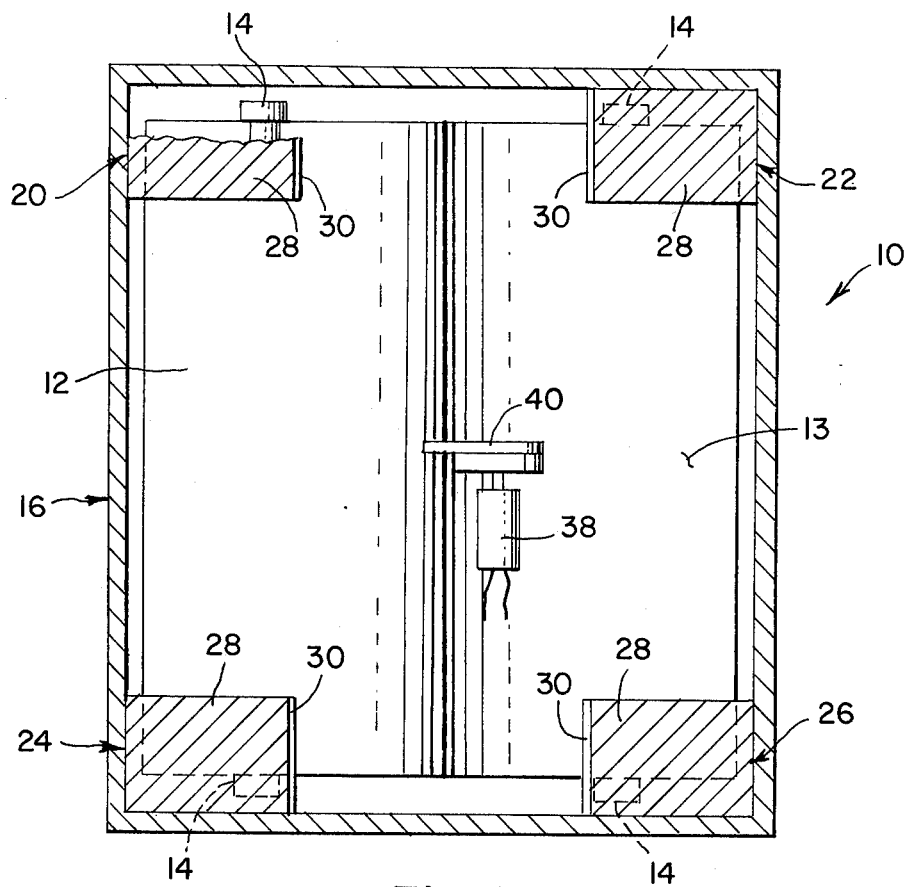

An electric motor 38 is mounted beneath the crib 12, preferably upon base member 16 or a bracket carried thereby. Desireably only one such motor is employed and mounted at approximately the center of the base. The motor may be of the variable speed type and in such event control means therefore are provided although not shown. Such control means may be any of the well known types as voltage and/or current regulators. As shown in FIGs. 1 and 2 the motor is operatively connected to the crib at approximately the longitudinal midpoint thereof. The motor may be provided with speed reduction means (not shown) the output shaft of which rotates a flywheel and cyclically actuates a crank mechanism including a connecting rod 40 which operatively connects the motor to the crib 12.

It will be recognized that by providing the arcuate bearing surfaces 30 upon which the crib is oscillatably rolled the problem inherent with many prior rockable cribs has been obviated. Thus, as the crib is given a rocking motion there will always be developed both vertical and horizontal force components. However, the resultant force acting upon the infant in the crib will always be substantially normal to the mattress upon which the child lies. The employment of separate platform stands at each corner of the base reduces the surface area frictionally engaged between the crib and the supporting assembly thereby minimizing the power requirements of the device. Location of the operative connection between the crib and the motor at approximately the longitudinal mid-point of the crib also serves to enhance the smooth and rythmic motion of the device.

From the foregoing it will be seen that an automatically rockable crib has been provided incorporating structural features which eliminate the imposition of a rolling force to the infant. The crib structure is simple and may be operated with minimum power requirements.

I claim:

1. An automatically rockable crib for infants comprising in combination:

a crib;

a crib support assembly rockably supporting said crib and including a base and a platform stand carried by said base at each corner thereof, each said platform stand being provided with an upwardly facing transversely extending arcuate surface, said crib including a contoured bottom portion at least in the regions overlying said arcuate surfaces, the contour of said contoured bottom portions being complementary to the contours of the underlying arcuate surfaces of said platform stands.

2. An automatically rockable crib according to claim 1, wherein said roller means are rotatably mounted on said crib.

3. An automatically rockable crib according to claim 2, wherein each of said arcuate surfaces is provided with a friction reducing coating at least along the predetermined path of said roller means thereon.

4. An automatically rockable crib according to claim 1, wherein said electric motor means is carried by said base at approximately the center thereof and includes a crank mechanism operatively connected to the crib at approximately the longitudinal mid-point thereof.

* * * * *